(12) United States Patent
Gao et al.

(10) Patent No.: US 12,485,432 B2
(45) Date of Patent: Dec. 2, 2025

(54) CYCLONE SEPARATOR AND CYCLONE SEPARATION METHOD

(71) Applicant: China University of Petroleum—Beijing, Beijing (CN)

(72) Inventors: Sihong Gao, Beijing (CN); Yiping Fan, Beijing (CN); Chunxi Lu, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 370 days.

(21) Appl. No.: 18/150,653

(22) Filed: Jan. 5, 2023

(65) Prior Publication Data
US 2024/0017275 A1 Jan. 18, 2024

(30) Foreign Application Priority Data
Jul. 12, 2022 (CN) .......................... 202210814139.4

(51) Int. Cl.
B04C 5/103 (2006.01)
B04C 3/06 (2006.01)
B04C 5/187 (2006.01)

(52) U.S. Cl.
CPC ................ B04C 5/103 (2013.01); B04C 3/06 (2013.01); B04C 5/187 (2013.01)

(58) Field of Classification Search
CPC .......... B04C 5/103; B04C 3/06; B04C 5/187; B04C 2003/006; B04C 5/081; B04C 5/13; B04C 5/04
See application file for complete search history.

(56) References Cited

U.S. PATENT DOCUMENTS 2,719,631 A * 10/1955 Pierre ....................... B04C 5/13
55/DIG. 32
3,386,588 A * 6/1968 Ades ........................ B04C 5/28
209/734
(Continued)

FOREIGN PATENT DOCUMENTS

CN 201791602 U * 4/2011
CN 104646195 A * 5/2015
(Continued)

OTHER PUBLICATIONS

Chinese First Office Action and Search Report issued on Nov. 29, 2024 for counterpart Chinese patent application No. 202210814139.4.
(Continued)

Primary Examiner — Dung H Bui
(74) Attorney, Agent, or Firm — The Dobrusin Law Firm, P.C.; Daniela M. Thompson-Walters

(57) ABSTRACT

The present disclosure provides a cyclone separator and a cyclone separation method. The cyclone separator includes a shell and a core tube. An upper end of the shell is provided with a gas inlet. A lower end of the shell is provided with a shell outlet. An opening at a lower end of the core tube is provided inside the shell. The lower end of the core tube is provided with a baffle structure, and at least a portion of the baffle structure extends vertically. By providing the baffle structure, the present disclosure can cut off the flow path of the short-circuit flow and the radially centripetal moving gas flow such as the centripetal flow in the particle spiral band area, weaken the short-circuit flow, the inner vortex flow and the precessing vortex core, thus improving separation efficiency of fine particles with particle diameters of 1 μm to 10 μm.

5 Claims, 9 Drawing Sheets

(56) References Cited

U.S. PATENT DOCUMENTS

| | | | | |
|---|---|---|---|---|
| 3,590,558 | A * | 7/1971 | Fernandes | B04C 5/103 55/460 |
| 3,960,734 | A * | 6/1976 | Zagorski | B04C 5/13 210/512.2 |
| 4,203,961 | A * | 5/1980 | Cowley | B01J 19/006 55/459.3 |
| 4,424,068 | A * | 1/1984 | McMillan | E21B 43/34 96/183 |
| 4,569,687 | A * | 2/1986 | Feng | B04C 5/00 55/DIG. 14 |
| 4,789,476 | A * | 12/1988 | Schulz | B04C 5/181 55/459.1 |
| 5,570,744 | A * | 11/1996 | Weingarten | B01D 17/0211 210/512.1 |
| 6,019,825 | A * | 2/2000 | Greene | B04C 5/103 96/216 |
| 6,312,594 | B1 * | 11/2001 | Conrad | B04C 3/00 55/459.3 |
| 6,837,912 | B1 * | 1/2005 | Heumann | B01D 45/16 55/424 |
| 9,022,231 | B1 * | 5/2015 | Ford | B04C 5/107 210/512.1 |
| 10,758,921 | B2 | 9/2020 | Lu et al. | |
| 2007/0234691 | A1 * | 10/2007 | Han | B04C 5/06 55/457 |
| 2009/0314161 | A1 * | 12/2009 | Al-Alusi | B04C 11/00 95/271 |
| 2010/0275561 | A1 * | 11/2010 | Lundquist | B04C 3/06 524/570 |
| 2015/0217211 | A1 * | 8/2015 | Swanborn | B01D 19/0057 96/216 |
| 2017/0008014 | A1 * | 1/2017 | Van Wolferen | A47L 9/1666 |
| 2017/0266586 | A1 * | 9/2017 | Hopper | B04C 5/08 |
| 2018/0154375 | A1 * | 6/2018 | Lamare | B04C 5/103 |

FOREIGN PATENT DOCUMENTS

| | | | | |
|---|---|---|---|---|
| CN | 204448317 | U * | 7/2015 | |
| CN | 105498986 | B | 4/2016 | |
| CN | 106269313 | B | 1/2017 | |
| CN | 106824571 | A | 6/2017 | |
| CN | 112191375 | A | 1/2021 | |
| DE | 3607023 | A1 * | 9/1987 | |
| DE | 4136935 | A1 * | 5/1993 | B04C 11/00 |
| EP | 0231931 | A2 | 8/1987 | |
| GB | 2101497 | A | 1/1983 | |
| SU | 956028 | A1 * | 9/1982 | |

OTHER PUBLICATIONS

Chinese Second Office Action issued on Jun. 30, 2025 for counterpart Chinese patent application No. 202210814139.4.

\* cited by examiner

CYCLONE SEPARATOR AND CYCLONE SEPARATION METHOD

TECHNICAL FIELD

The present disclosure relates to the technical field of gas purification, and particularly to a cyclone separator and a cyclone separation method.

BACKGROUND

Taking advantage of density differences between heterogeneous systems, the cyclone separator separate particles from gas flow in a centrifugal force field formed by high-speed rotation of gas flow. With the advantages of simple structure, low operation and maintenance cost, and high separation efficiency, the cyclone separator is widely used in various fields such as coal, oil, natural gas, food and medicine, and industrial and household vacuum cleaners.

The cyclone separator separates gas and solid (liquid) by centrifugal force. The to-be-treated gas enters the cyclone separator through an inlet pipe in a tangential direction, and flows around a core tube to form an oblique downward rotating flow, which is usually called as an outer vortex flow (i.e., a particle (solid dust or liquid droplet) spiral band). The outer vortex flow moves downwards along an axial direction of the cyclone separator to the vicinity of a cone-shaped outlet of the cyclone separator, then turns back upward to form an inner vortex flow, and is finally discharged through the core tube. When rotating along with the outer vortex flow, the particles are separated from the gas-flow body of the outer vortex flow by centrifugal force, and move radially to the wall of the cyclone shell and are captured by the wall.

The cyclone separator has high separation efficiency for particles with particle diameters larger than 10 μm. However, the cyclone separator has low separation efficiency for fine particles with particle diameters less than 10 μm, and is almost impossible to be used to separate particles with particle diameters less than 5 μm, which limit the application range of the cyclone separator.

Chinese invention patent application CN105498986B discloses a cyclone separator for isolating inlet gas-flow and shunting outlet gas-flow. By providing a slit at a lower portion of a core tube of the cyclone separator, a short-circuit flow in the cyclone separator is forced to enter the core tube in a reverse spiral direction, thus realizing the separation of particles with particle diameters of 5 μm to 10 μm. However, the slit is easily clogged, leading to an invalid of the separator, and in addition, the reverse spiral movement of the gas flow results in a high pressure drop of the separator. In addition, as the bottom of the core tube is a through structure, it is impossible to eliminate the radial escape of fine particles in the particle spiral band following the centripetal gas flow, and the back-mixing of particles caused by a precessing vortex core.

Chinese invention patent application CN106269313B discloses a cyclone separator with guide vanes mounted in a central cylinder. By mounting guide vanes in an offset central cylinder, a main gas stream in an inner vortex flow is forced to flow mainly at a vertical upward axial velocity, thus weakening the inner vortex flow, reducing the pressure drop of the separator and improving the separation efficiency of fine particles. However, this solution cannot avoid the short-circuit flow in a lower portion of the core tube, and cannot prevent the radial escape of fine particles in the particle spiral band following the centripetal flow gas.

U.S. Pat. No. 10,758,921 discloses a multi-stage gas-solid (liquid) separation method of combining a swirl separation with a filtration/adsorption separation. The to-be-treated gas is first pre-separated in a swirl field, where particles with large particle diameter are separated from the gas, and then subjected to a secondary filtration/adsorption separation by a granular bed, where fine particles/gaseous impurities are separated from the gas, thus achieving high efficiency, low resistance, and synergistic strengthening of various separation mechanisms. However, in order to ensure the long-term stable operation of the device, a granule circulation and regeneration system needs to be equipped. As a result, the device cannot be applied flexibly on a small scale.

Chinese invention patent application CN112191375A discloses a spray type cyclone separator. By spraying and humidifying the gas with dust at an inlet, tiny particles in a gas flow are agglomerated to form particles with larger diameters, thus improving the separation efficiency of the tiny particles without a significant increase in the pressure drop of the device. However, due to the existence of the liquid phase, this method is not suitable for separating gas and solid phases at a high temperature. In addition, due to the addition of the liquid phase, dust particles are easy to adhere to a wall of the separator, which leads to a difficulty in discharging material.

SUMMARY

The present disclosure provides a cyclone separator and a cyclone separation method. In the present disclosure, a baffle structure is provided to cut off the flow path of the short-circuit flow and the radially centripetal moving gas flow such as the centripetal flow in a particle spiral band, weaken the inner vortex flow, eliminate the back-mixing of particles caused by the short-circuit flow, the centripetal moving flow in the particle spiral band and the precessing vortex core, improve the separation efficiency of the cyclone separator for fine particles with particle diameters of 1 to 10 μm, and reduce pressure drop of the cyclone separator, thus meeting the requirement of high efficiency and low resistance of the cyclone separator and the increasingly strict requirement of the environmental protection emission.

The above objective of the present disclosure can be achieved by adopting the following technical solutions.

It is one aspect of the present disclosure to provide a cyclone separator including a shell and a core tube, wherein an upper end of the shell is provided with a gas inlet, and a lower end of the shell is provided with a shell outlet; an opening at a lower end of the core tube is provided inside the shell; the lower end of the core tube is provided with a baffle structure, and at least a portion of the baffle structure extends vertically.

In an exemplary embodiment, the baffle structure includes a first baffle fixedly connected to the lower end of the core tube, and the first baffle extends along an axial direction of the core tube and along part of a circumferential area of a sidewall of the core tube.

In an exemplary embodiment, the core tube is a cylindrical barrel, and the first baffle is a first arc-shaped plate arranged opposite to the gas inlet in a circumferential direction; a height of a portion of the core tube inserted into the shell from the upper end of the shell is denoted as $S_1$, a height of the first baffle is denoted as $S_2$, and $0.2 \leq (S_2/S_1) \leq 2.0$.

In an exemplary embodiment, the baffle structure is fixedly connected to the lower end of the core tube, and the baffle structure includes a plurality of second baffles distributed along an axial direction of the core tube; each of the second baffles extends along the axial direction of the core tube and along part of a circumferential area of a sidewall of the core tube, and the two adjacent second baffles are arranged opposite to and at least partially overlapped with each other in a circumferential direction.

In an exemplary embodiment, the core tube is a cylindrical barrel, some of the second baffle plates are second arc-shaped plates of column shape, and some other second baffle plates are conical plates of cone shape; an outer diameter of the conical plate gradually decreases from an upper end to a lower end thereof, and the conical plates are located at a lower end of the second arc-shaped plate; the baffle structure includes a vortex stabilizing stick connected to the lower end of the conical plate, and the vortex stabilizing stick extends along an axial direction of the core tube.

In an exemplary embodiment, the baffle structure includes a spiral baffle fixedly connected to the lower end of the core tube and extending spirally along an axial direction of the core tube, and an upper end of the spiral baffle is arranged opposite to the gas inlet in a circumferential direction; a lower end of the spiral baffle is connected to a vortex stabilizing stick which extends along the axial direction of the core tube.

In an exemplary embodiment, the baffle structure includes a first baffle fixedly connected to the lower end of the core tube, and the first baffle extends along an axial direction of the core tube and along part of a circumferential area of a sidewall of the core tube; a lower middle portion of the first baffle is connected to a spiral baffle, which extends spirally along the axial direction of the core tube; a lower end of the spiral baffle is connected to a vortex stabilizing stick which extends along the axial direction of the core tube.

In an exemplary embodiment, the cyclone separator includes a gas injection device for injecting gas downward to form a gas curtain which serves as the baffle structure.

In an exemplary embodiment, the shell comprises a first cylindrical barrel and a first conical barrel connected to a lower end of the first cylindrical barrel; a lower end of the first conical barrel is provided with a dust hopper which comprises a second cylindrical barrel and a second conical barrel, and the second conical barrel is connected to a lower end of the second cylindrical barrel; an inner diameter of the second cylindrical barrel is greater than that of the lower end of the first conical barrel.

It is another aspect of the present disclosure to provide a cyclone separator including: a shell, an upper end of which is provided with a gas inlet and a lower end of which is provided with a shell outlet; a core tube, at least lower portion of which is provided inside the shell and is located between the gas inlet and the shell outlet, wherein the gas inlet is provided in a direction parallel to a first tangent line which is tangent to the core tube, so that to-be-treated gas enters the shell in a direction tangent to the core tube; and a baffle structure provided inside the shell and connected to the lower portion of the core tube, wherein at least part of the baffle structure extends towards the shell outlet from a contact point of a second tangent line which is tangent to the core tube, and the second tangent line is parallel to the first tangent line.

In an exemplary embodiment, the baffle structure includes a first baffle extending from the contact point along an axial direction of the core tube towards the shell outlet and extending from the contact point along a circumferential direction of the core tube towards opposite sides of the contact point.

In an exemplary embodiment, the baffle structure includes a plurality of second baffles connected sequentially along an axial direction of the core tube between the core tube and the shell outlet, wherein any two of the plurality of second baffles adjacent to each other are arranged opposite to each other in a circumferential direction of the core tube, and one of the plurality of second baffles closest to the core tube extends from the contact point along the axial direction of the core tube towards the shell outlet and extends from the contact point along the circumferential direction of the core tube towards opposite sides of the contact point.

In an exemplary embodiment, the baffle structure includes a spiral baffle extending spirally from the contact point towards the shell outlet.

In an exemplary embodiment, the baffle structure includes: a first baffle extending from the contact point along an axial direction of the core tube towards the shell outlet and extending from the contact point along a circumferential direction of the core tube towards opposite sides of the contact point; and a spiral baffle extending spirally from a lower end of the first baffle towards the shell outlet.

It is still another aspect of the present disclosure to provide a cyclone separation method using the above cyclone separator, wherein the cyclone separation method comprises: to-be-treated gas with particles enters the shell through the gas inlet; at least some of particles in the to-be-treated gas are prevented by the baffle structure from entering the core tube along with the gas flowing in a radial direction, so that substantially all of the particles are separated from the gas by centrifugal force and discharged downward through the shell outlet; clean gas is discharged upward through the core tube.

The present disclosure has the following characteristics and advantages.

The baffle structure can effectively isolate the particle spiral band in the outer vortex flow area from the inner vortex flow, cut off the flow path of the short-circuit flow and the radially centripetal moving gas flow such as the centripetal flow in the particle spiral band area, weaken the strengths of the short-circuit flow, the inner vortex flow and the precessing vortex core, reduce the turbulent intensity of the inner vortex flow, eliminate the back-mixing of particles caused by the short-circuit flow, the centripetal flow in the particle spiral band area and the precessing vortex core, prevent a large amount of particles from entering the inner vortex flow, and effectively improve the separation efficiency of the cyclone separator, especially the separation effect on fine particles with particle diameters of 1 μm to 10 μm. Meanwhile, the baffle structure can efficiently reduce the pressure drop of the cyclone separator, and meet the requirement of high efficiency and low resistance of the cyclone separator.

BRIEF DESCRIPTION OF THE DRAWINGS

For a clearer illustration of technical features in the embodiments of the present disclosure, a brief description of the drawings for the embodiments will be given below. Obviously, the drawings described below involve only some embodiments of this disclosure. For those of ordinary skill in the art, other drawings can be derived from these drawings without any inventive efforts.

DETAILED DESCRIPTION

Figure 1:
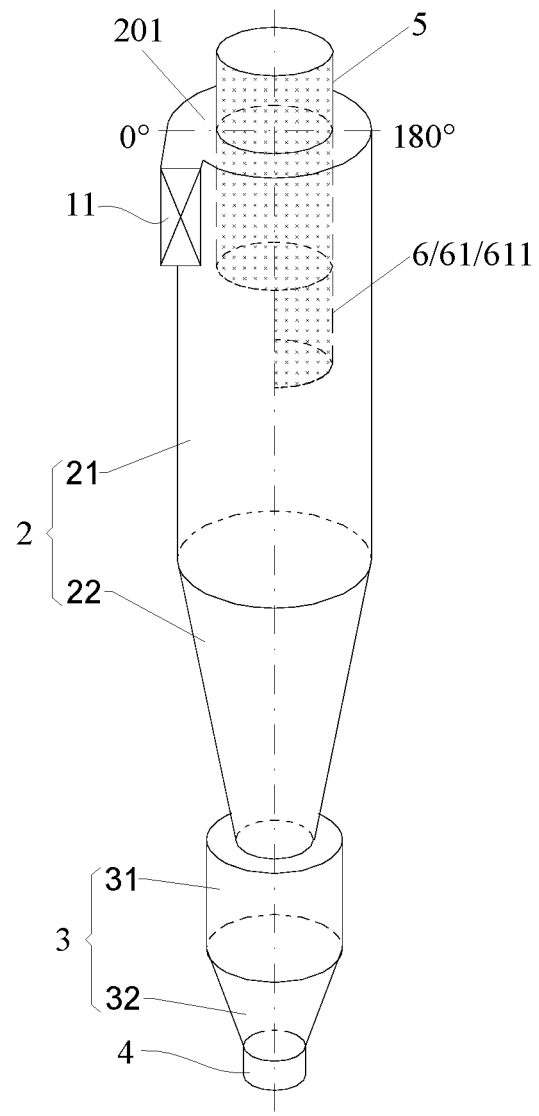
FIG. 1 is a schematic structural diagram of a cyclone separator according to an embodiment of the present disclosure.

The technical solutions in the embodiments of the present disclosure will be clearly and completely described below with reference to the drawings in the embodiments of the present disclosure. Obviously, those described are only part, rather than all, of the embodiments of the present disclosure. All other embodiments derived by persons skilled in the art from the embodiments of the present disclosure without making inventive efforts shall fall within the scope of the present disclosure.

The inventor has discovered through his research of the cyclone separator that the internal flow field of the cyclone separator is a non-axisymmetric 'double-vortex' strongly-swirling turbulent flow field, which is divided into an outer vortex flow area and an inner vortex flow area bounded by a columnar plane where a core tube 5 is located. In the outer vortex flow area, the gas with dust enters a gas inlet 11 in a tangential direction and flows around the core tube 5, and then forms a band-shaped gas-flow body with dust (i.e., a particle spiral band) flowing spirally downward with a certain spiral angle and a certain width at a positon with an azimuth angle of 180° at a lower end of the core tube 5. The gas in the particle spiral band is divided into two parts: one part flows spirally downward to the vicinity of an outlet of a first conical barrel 22 along with the particle spiral band, and then turns back upward to form an inner vortex flow; the other part flows in a radial direction towards the centre to merge into the inner vortex flow during the spiral downward flow of the particle spiral band. Since an opening at the lower end of the core tube 5 is located in a negative pressure center of the flow field of the cyclone separator, the gas with dust flowing around the core tube 5 is easy to generate a strong short-circuit flow at the positon with the azimuth angle of 180° at the lower end of the core tube 5, resulting in a large amount of particles escaping by directly merging into the inner vortex flow. Most of the particles in the particle spiral band can be separated from the gas by moving to the wall of the shell 2 by centrifugal force. However, since the particles with particle diameters less than 10 μm have a strong ability to move with the gas flow, these particles will follow with the gas flow flowing in a radial direction towards the centre and merge into the inner vortex flow, and will not be separated from the gas due to the strong turbulence of the inner vortex flow. The inner vortex flow located between a lower end of the core tube 5 and the outlet of the first conical barrel 22 is not limited by a physical interface, so the tail of the inner vortex flow is unfixable and is in a strong swinging state, thus forming the precessing vortex core, which is commonly known as the 'fishtailing' phenomenon. The swinging swirl gas will strongly disturb the particles descending to zones such as the outlet of the first conical barrel 22 and the dust hopper 3, thereby causing serious back-mixing of the particles. The above defects in the internal flow field of the cyclone separator, including the short-circuit flow at a positon with the azimuth angle of 180° at the lower end of the core tube 5, the centripetal flow in the particle spiral band area, and the precessing vortex core, etc., are easy to cause the back-mixing of particles, resulting in a sudden reduction in the separation efficiency of the cyclone separator for fine particles with a particle diameter less than 10 μm and a failure to separate particles with a particle diameter less than 5 μm, which limit the application of the cyclone separator in the field of fine particle separation. In addition, the intense swirling friction of the inner vortex flow also leads to a large amount of energy dissipation, which is manifested in high pressure drop of the device.

Therefore, the inventor improves the cyclone separator.

It is one aspect of the present disclosure to provide a cyclone separator, as illustrated in FIGS. 1 to 11, which includes a shell 2 and a core tube 5. An upper end of the shell 2 is provided with a gas inlet 11, and a lower end of the shell 2 is provided with a shell outlet 12. An opening at a lower end of the core tube 5 is provided inside the shell 2. The lower end of the core tube 5 is provided with a baffle structure 6, and at least a portion of the baffle structure 6 extends vertically.

The to-be-treated gas enters the shell 2 through the gas inlet 11 in a tangential direction, forming an outer vortex flow and an inner vortex flow bounded by a columnar plane where the core tube 5 is located. In the outer vortex flow area, with the spirally downward movement of the gas-flow body of the to-be-treated gas, most of the particles are separated from the gas-flow body by centrifugal force, move radially to the wall of the shell 2 and are captured by the wall, then move downward along the wall of the shell 2 and are discharged from the shell outlet 12. When the outer vortex flow moves downward along an axial direction of the shell 2 to the vicinity of the shell outlet 12, it turns back upward to form an inner vortex flow, which enters the core tube 5 and is discharged through the core tube 5.

The baffle structure 6 can effectively isolate the particle spiral band in the outer vortex flow area from the inner vortex flow, cut off the flow path of the short-circuit flow and the radially centripetal moving gas flow such as the centripetal flow in the particle spiral band area, weaken the strengths of the short-circuit flow, the inner vortex flow and the precessing vortex core, reduce the turbulent intensity of the inner vortex flow, eliminate the back-mixing of particles caused by the short-circuit flow, the centripetal flow in the particle spiral band area and the precessing vortex core, prevent a large amount of particles from entering the inner vortex flow, and effectively improve the separation efficiency of the cyclone separator, especially the separation effect on fine particles with particle diameters of 1 μm to 10 μm. Meanwhile, the baffle structure 6 can weaken the swirling movement of the inner vortex flow, thus weakening the gas internal friction, reducing the pressure drop of the cyclone separator, and meeting the requirement of high efficiency and low resistance of the cyclone separator.

Figure 11:
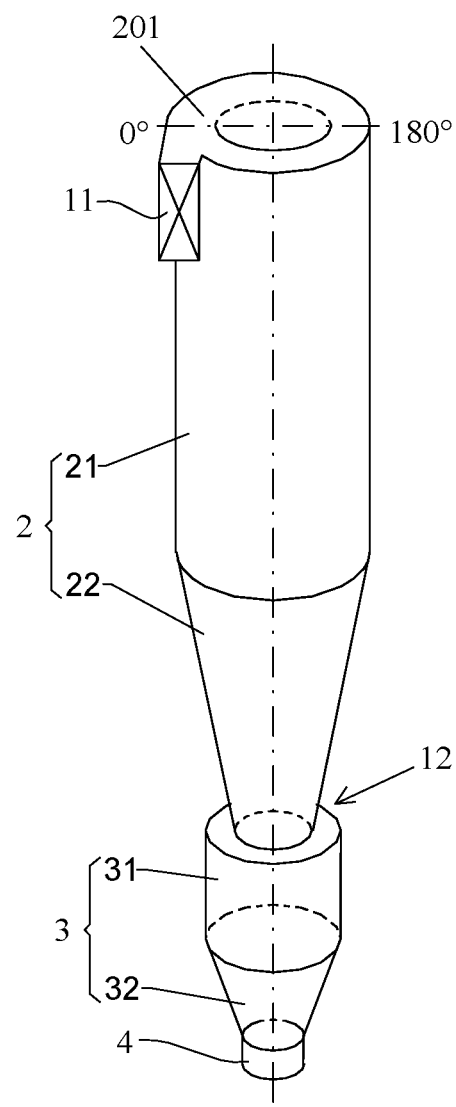
FIG. 11 is a schematic structural diagram of a shell and a dust hopper in a cyclone separator according to the present disclosure.

Optionally, the core tube 5 is a cylindrical barrel. The shell 2 includes a first cylindrical barrel 21 and a first conical barrel 22 which is connected to a lower end of the first cylindrical barrel 21. A lower end of the first conical barrel 22 is provided with a dust hopper 3, which includes a second cylindrical barrel 31 and a second conical barrel 32 connected to a lower end of the second cylindrical barrel 31. An inner diameter of the second cylindrical barrel 31 is greater than that of the lower end of the first conical barrel 22. As illustrated in FIG. 11, a lower portion of the second conical barrel 32 is connected to a discharge pipe 4. The captured particles move downward along walls of the first cylindrical barrel 21 and the first conical barrel 22 to the second cylindrical barrel 31 of the dust hopper 3, and then pass through the second conical barrel 32 to the discharge pipe 4 for discharge. Specifically, a top end of the first cylindrical barrel 21 is hermetically connected to a top plate 201. The first cylindrical barrel 21 and the first conical barrel 22 are coaxial and directly connected in a sealed manner. The core tube 5 is hermetically disposed to pass through a center of the top plate 201, and the core tube 5 is coaxially and parallelly arranged with the shell 2. Optionally, a ratio of a height to a diameter of the first cylindrical barrel 21 ranges from 2 to 5.

Figure 12:
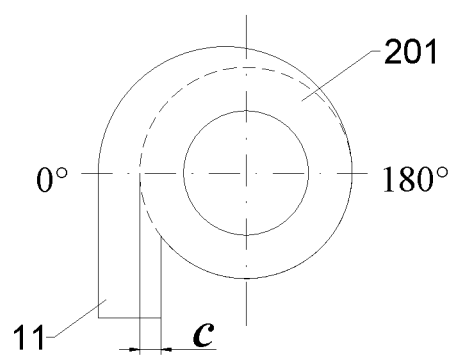
FIG. 12 is a top view of a cyclone separator according to the present disclosure.

The gas inlet 11 is tangentially provided on an upper sidewall of the first cylindrical barrel 21. A direction of a connecting line from a tangential point between the gas inlet 11 and the first cylindrical barrel 21 to the center of the first cylindrical barrel 21 is defined as an azimuth angle of 0°, and the azimuth angle is positioned in a clockwise direction. Specifically, the gas inlet 11 may be a tangential inlet or a volute inlet. Optionally, a cross section of the gas inlet 11 is rectangular, with an aspect ratio ranging from 1.8 to 2.5. As illustrated in FIG. 12, optionally, a ratio of a cut degree c. of the gas inlet 11 to a width of the gas inlet 11 ranges from 0 to 1, and exemplarily is equal to ⅓. A ratio of a cross-sectional area of the gas inlet 11 to that of the first cylindrical barrel 21 ranges from ⅓ to ⅙, wherein the cross section of the gas inlet 11 is parallel to an axial direction of the first cylindrical barrel 21, and a cross section of the first cylindrical barrel 21 is perpendicular to the axial direction of the first cylindrical barrel 21. A height of a portion of the core tube 5 inserted into the shell 2 from the upper end of the shell 2 is denoted as $S_1$. Further, a ratio of $S_1$ to the height of the gas inlet 11 ranges from 0.8 to 1.2, exemplarily is equal to 1.0.

The baffle structure 6 is located at the lower end of the core tube 5, and extends along an axial direction of the core tube 5 and along part of a circumferential area of the sidewall of the core tube 5, so as to prevent the gas from flowing in radial direction. There are many ways to form the baffle structure 6. In order to improve the separation effect on the fine particles, the inventor makes further improvements.

Figure 2:
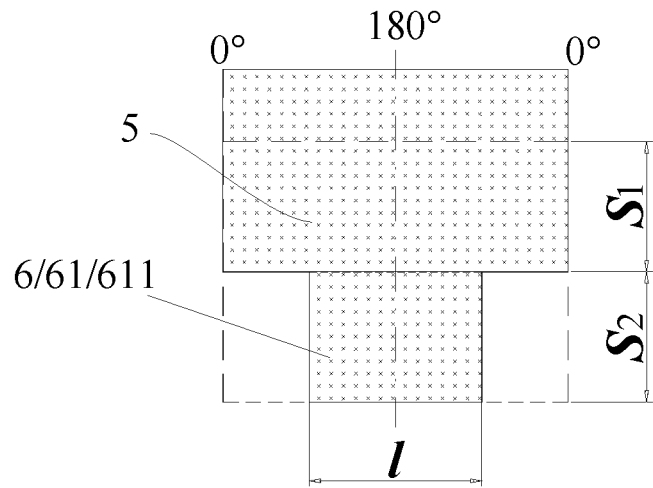
FIG. 2 is an expanded view of a core tube and a baffle structure in the cyclone separator illustrated in FIG. 1.

In some embodiments, the baffle structure 6 includes a first baffle 61 fixedly connected to the lower end of the core tube 5. As illustrated in FIG. 1, the first baffle 61 extends along the axial direction of the core tube 5 and along part of a circumferential area of the sidewall of the core tube 5. The lower end of the core tube 5 is located at a negative pressure center of the flow field of the cyclone separator, and the to-be-treated gas flowing around the core tube 5 will generate a strong short-circuit flow at a position with the azimuth angle of 180° at the lower end of the core tube 5, which makes the particles have a tendency of merging into the inner vortex flow. Therefore, in this embodiment, the first baffle 61 is provided at the lower end of the core tube 5, so as to block the radial flow path of the gas and eliminate the short-circuit flow, thus improving the separation efficiency of the fine particles, The first baffle 61 may be directly connected to the lower end of the core tube 5 in a sealed manner. Further, the first baffle 61 is a first arc-shaped plate 611, and is arranged opposite to the gas inlet 11 in the circumferential direction. Optionally, the first baffle 61 is concentric with the core tube 5, and the central portion of the first baffle 61 is arranged at a position with an azimuth angle of 180°. The first baffle 61 is the first arc-shaped plate 611 with an arc-shaped façade and an arc angle of 180°, i.e., the circumferential area of the sidewall of the core tube 5 corresponding to the first baffle 61 has a central angle of 180°. As illustrated in FIG. 2, the core tube 5 and the first baffle 61 are unfolded into a plane, and a width/of the first baffle 61 having been unfolded is equal to a half of a perimeter of the core tube 5. Further, a height of the first baffle 61 is denoted as $S_2$, which satisfies $0.2 \leq (S_2/S_1) \leq 2.0$, and exemplarily $S_2/S_1 = 0.7$.

Figure 3:
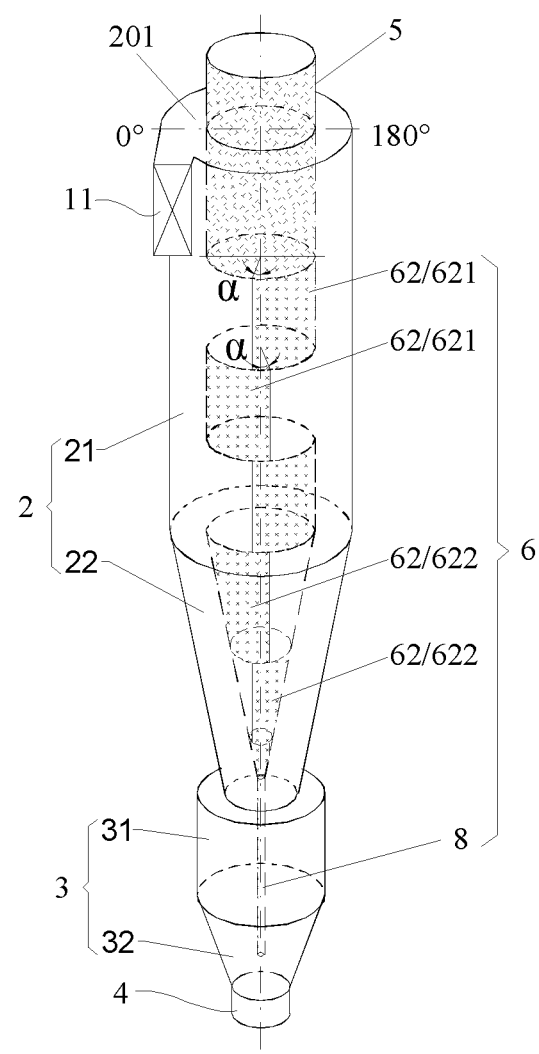
FIG. 3 is a schematic structural diagram of a cyclone separator according to another embodiment of the present disclosure.

In some embodiments, the baffle structure 6 is fixedly connected to the lower end of the core tube 5, and includes a plurality of second baffles 62 distributed along the axial direction of the core tube 5. As illustrated in FIG. 3, each second baffles 62 extends along the axial direction of the core tube 5 and along part of the circumferential area of the sidewall of the core tube 5. The two adjacent second baffles 62 are arranged opposite to and at least partially overlapped with each other in the circumferential direction. In the outer vortex flow area, the to-be-treated gas entering into the shell 2 through the gas inlet 11 flows around the core tube 5, and then forms a band-shaped gas flow body with dust (i.e., a particle spiral band) flowing spirally downward with a certain spiral angle and a certain width at a position with the azimuth angle of 180° at the lower end of the core tube 5, and in addition, the lower end of the core tube 5 is located at a negative pressure center of the flow field of the cyclone separator, the to-be-treated gas flowing around the core tube 5 will generate a strong short-circuit flow at a position with the azimuth angle of 180° at the lower end of the core tube 5, which makes the particles have a tendency of merging into the inner vortex flow. Therefore, in this embodiment, the second baffle 62 is provided at the lower end of the core tube 5, so as to block the radial flow path of the gas and eliminate the short-circuit flow, thus improving the separation efficiency of the fine particles. Further, since the fine particles with particle diameters less than 10 μm have a strong ability to move with the gas flow, the fine particles with particle diameters less than 10 μm in particle spiral band area are easy to escape by following with the gas flow flowing in a radial direction towards the centre and merging into the inner vortex flow. Therefore, in this embodiment, the second baffles 62 are distributed along the axial direction of the core tube 5, so as to isolate the particle spiral band in the outer vortex flow area from the inner vortex flow, prevent the centripetal flow in the particle spiral band area from carrying a large amount of particles into the inner vortex flow, and reduce the turbulent intensity of the inner vortex flow, thus improving the separation effect on the fine particles while reducing the pressure drop of the device.

An uppermost second baffle 62 may be directly connected to the lower end of the core tube 5 in a sealed manner. The uppermost second baffle 62 is arranged opposite to the gas inlet 11 in the circumferential direction. The two adjacent second baffles 62 are arranged opposite to each other in the circumferential direction. Exemplarily, the second baffle 62 is concentric with the core tube 5. A central portion of the uppermost second baffle 62 is arranged at a position with an azimuth angle of 180°, and a central portion of the second baffle 62 on a second layer is arranged at a position with an azimuth angle of 0°. Further, some second baffles 62 are second arc-shaped plates 621 of column shape, and some other second baffles 62 are conical plates 622 of cone shape. The conical plates 622 are located at the lower end of the second arc-shaped plate 621, and an outer diameter of the conical plate 622 gradually decreases from an upper end to a lower end thereof.

Figure 4:
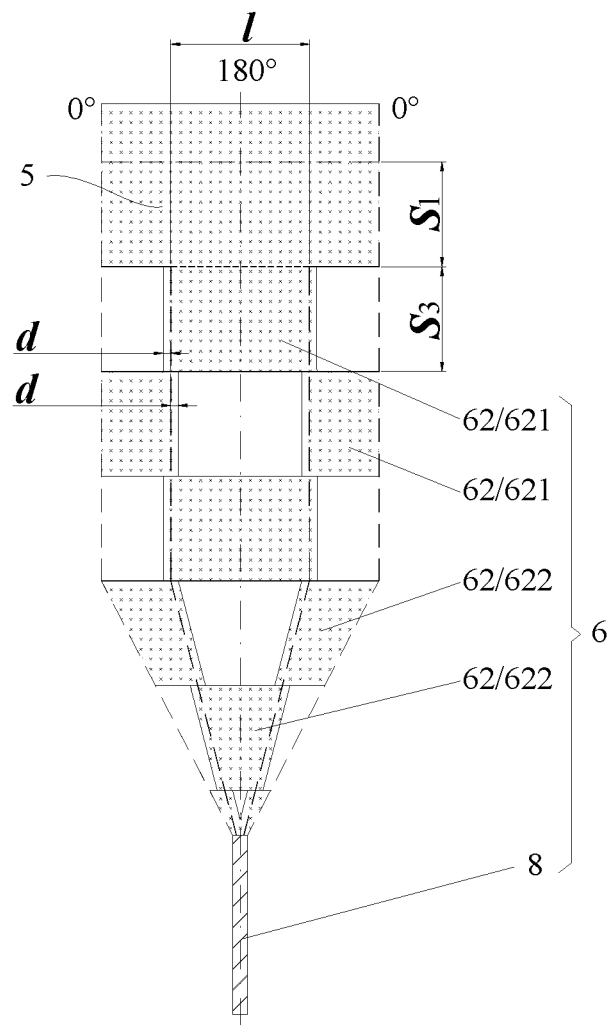
FIG. 4 is an expanded view of a core tube and a baffle structure in the cyclone separator illustrated in FIG. 3.

As illustrated in FIG. 3, the second arc-shaped plate 621 is an arc-shaped façade with an arc angle of (180°+2a), where a is a coincidence degree of the second arc-shaped plates 621 in two adjacent layers, i.e., the circumferential area of the sidewall of the core tube 5 corresponding to the second arc-shaped plate 621 has a central angle of (180°+2a). As illustrated in FIG. 4, the core tube 5 and the second baffle 62 are unfolded into a plane, and a width of the second arc-shaped plate 621 having been unfolded is greater than a half of a perimeter of the core tube 5, with a difference of 2d therebetween. Exemplarily, 6°≤a≤18, and a coincident arc length d satisfies d≥10 mm.

As illustrated in FIGS. 3 and 4, at least some of the second baffles 62 located inside the first cylindrical barrel 21 are the second arc-shaped plates 621, and at least some of the second baffles 62 located inside the first conical barrel 22 are the conical plates 622. Further, the second arc-shaped plate 621 and the conical plate 622 have an equal height denoted as $S_3$. Optionally, $0.5 \leq (S_3/S_1) \leq 2.0$, and more exemplarily $(S_3/S_1)=1$.

Further, the baffle structure 6 includes a vortex stabilizing stick 8 connected to the lower end of the conical plate 622 and extending along the axial direction of the core tube 5, so as to weaken the back-mixing of particles caused by swinging of the precessing vortex core, and further improve the separation efficiency. The second baffle 62 is coaxial and parallel to the shell 2, and the second baffle 62 at the first conical barrel 22 gradually withdraws to the lower part of the first conical barrel 22, and is connected to the vortex stabilizing stick 8. Optionally, the vortex stabilizing stick 8 extends to the second conical barrel 32, and the vortex stabilizing stick 8 may be a solid column member.

Figure 5:
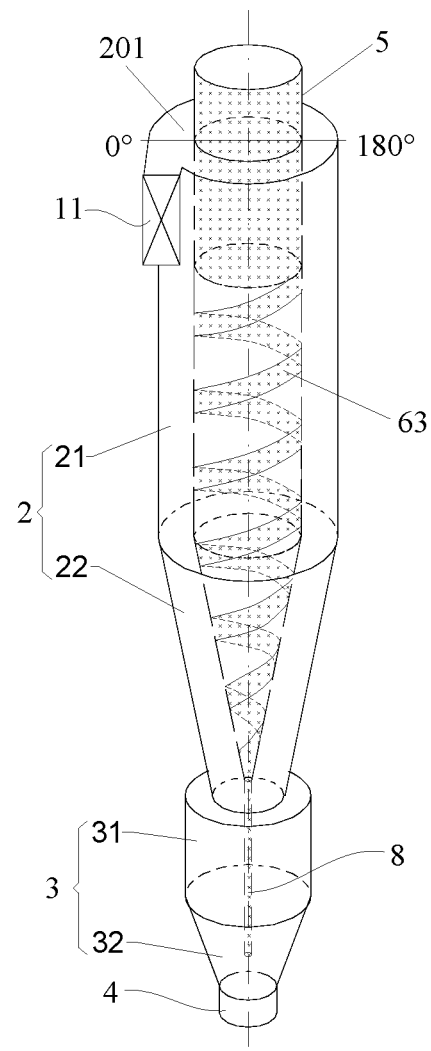
FIG. 5 is a schematic structural diagram of a cyclone separator according to yet another embodiment of the present disclosure.

In some embodiments, the baffle structure 6 includes a spiral baffle 63 fixedly connected to the lower end of the core tube 5. As illustrated in FIG. 5, the spiral baffle 63 extends spirally along the axial direction of the core tube 5, and an upper end of the spiral baffle 63 is arranged opposite to the gas inlet 11 in the circumferential direction. In outer vortex flow area, the to-be-treated gas entering into the shell 2 through the gas inlet 11 flows around the core tube 5 and then forms a band-shaped gas flow body with dust (i.e., a particle spiral band) flowing spirally downward with a certain spiral angle and a certain width at a position with the azimuth angle of 180° at the lower end of the core tube 5, and in addition, the lower end of the core tube 5 is located at a negative pressure center of the flow field of the cyclone separator, the to-be-treated gas flowing around the core tube 5 will generate a strong short-circuit flow at a position with the azimuth angle of 180° at the lower end of the core tube 5, which makes the particles have a tendency of merging into the inner vortex flow. Therefore, in this embodiment, the spiral baffle 63 are provided to block a radial flow path of the gas, eliminate the short-circuit flow, and improve the separation efficiency. Further, since the fine particles with particle diameters less than 10 μm have a strong ability to move with the gas flow, the fine particles with particle diameters less than 10 μm in the particle spiral band area are easy to escape by following with the gas flow flowing in a radial direction towards the centre and merging into the inner vortex flow. Therefore, in this embodiment, the spiral baffle 63 are provided to isolate the particle spiral band in the outer vortex flow area from the inner vortex flow, prevent the centripetal flow in the particle spiral band area from carrying a large amount of particles into the inner vortex flow, and reduce the turbulent intensity of the inner vortex flow, thus improving the separation effect on the fine particles while reducing the pressure drop of the device.

Figure 6:
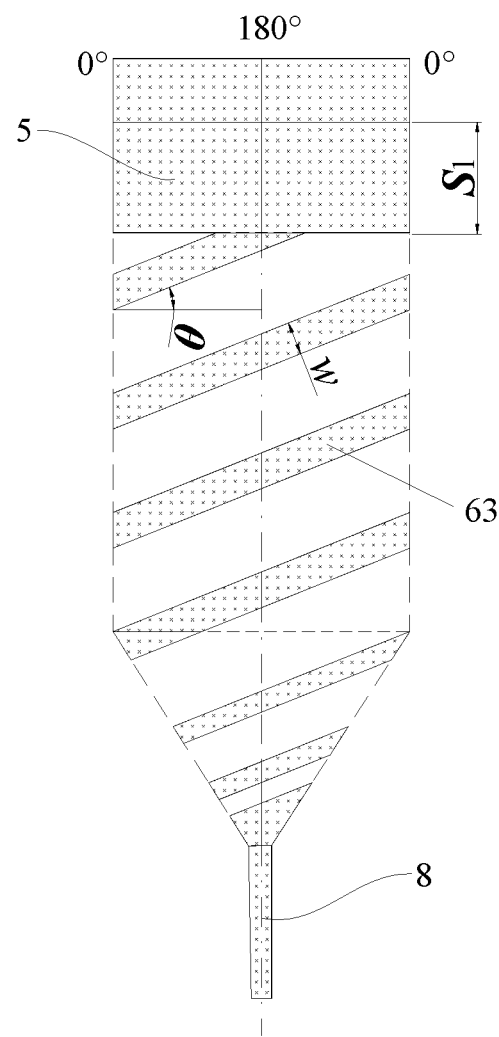
FIG. 6 is an expanded view of a core tube and a baffle structure in the cyclone separator illustrated in FIG. 5.

As illustrated in FIG. 5, the spiral baffle 63 is of spiral band shape. The spiral baffle 63 extends from a position with an azimuth angle of 180° at the lower end of the core tube 5. The spiral baffle 63 is coaxial and parallel to the shell 2. The spiral direction of the spiral baffle 63 may be clockwise or counterclockwise. Further, as illustrated in FIG. 6, the core tube 5 and the spiral baffle 63 are unfolded into a plane, a ratio of a width w of the spiral baffle 63 to a height of the gas inlet 11 ranges from 0.8 to 2.1, and a spiral angle θ of the spiral baffle 63 ranges from 15° to 75°. The spiral angle θ of the spiral baffle 63 is close to or equal to that of the spirally downward band-shaped gas-flow body with dust. The width w of the spiral baffle 63 is close to or equal to that of the spirally downward band-shaped gas-flow body with dust.

Further, the lower end of the spiral baffle 63 is connected to a vortex stabilizing stick 8, which extends along the axial direction of the core tube 5. The vortex stabilizing stick 8 provided at the lower part of the spiral baffle 63 can effectively weaken the back-mixing of particles caused by swinging of the precessing vortex core, thus further improving the separation efficiency. The spiral baffle 63 gradually spirally withdraws at the first conical barrel 22 to the lower part thereof to connect the vortex stabilizing stick 8.

Figure 7:
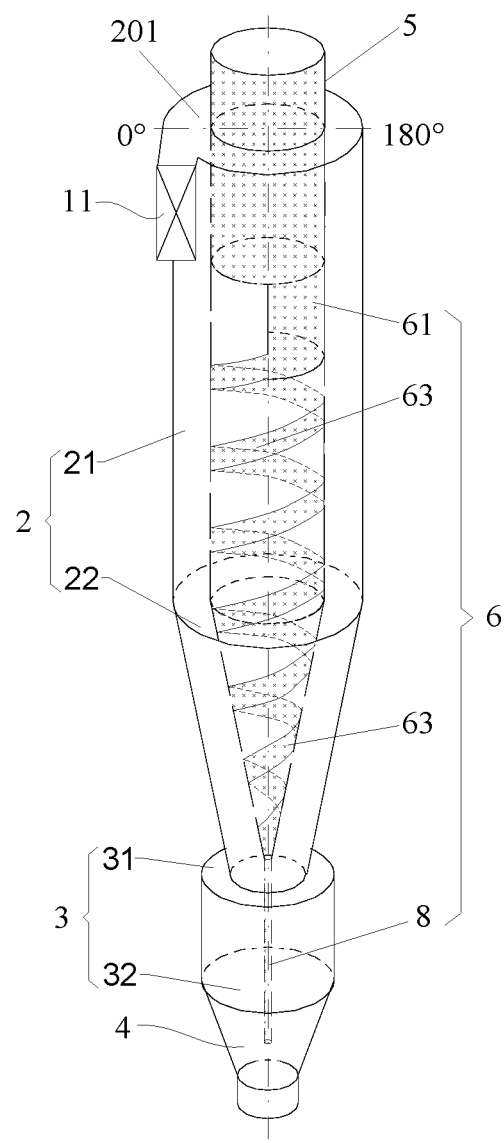
FIG. 7 is a schematic structural diagram of a cyclone separator according to still another embodiment of the present disclosure.

In some other embodiments, as illustrated in FIG. 7, the baffle structure 6 further includes a first baffle 61 fixedly connected to the lower end of the core tube 5. The first baffle 61 extends along the axial direction of the core tube 5 and along part of the circumferential area of the sidewall of the core tube 5. The lower middle portion of the first baffle 61 is connected to a spiral baffle 63 which extends spirally along the axial direction of the core tube 5. A lower end of the spiral baffle 63 is connected to a vortex stabilizing stick 8 which extends along the axial direction of the core tube 5. The first baffle 61 can block a radial flow path of gas, effectively eliminate the short-circuit flow, thus improving the separation efficiency. The spiral baffle 63 is provided to isolate the particle spiral band in the outer vortex flow area from the inner vortex flow, prevent the centripetal flow in the particle spiral band area from carrying a large amount of particles into the inner vortex flow, and reduce the turbulent intensity of the inner vortex flow, thus improving the separation effect on the fine particles while reducing the pressure drop of the device. Meanwhile, the vortex stabilizing stick 8 at the lower part of the spiral baffle 63 can effectively weaken the back-mixing of particles caused by swinging of the precessing vortex core, and further improve the separation efficiency of the cyclone separator.

Figure 8:
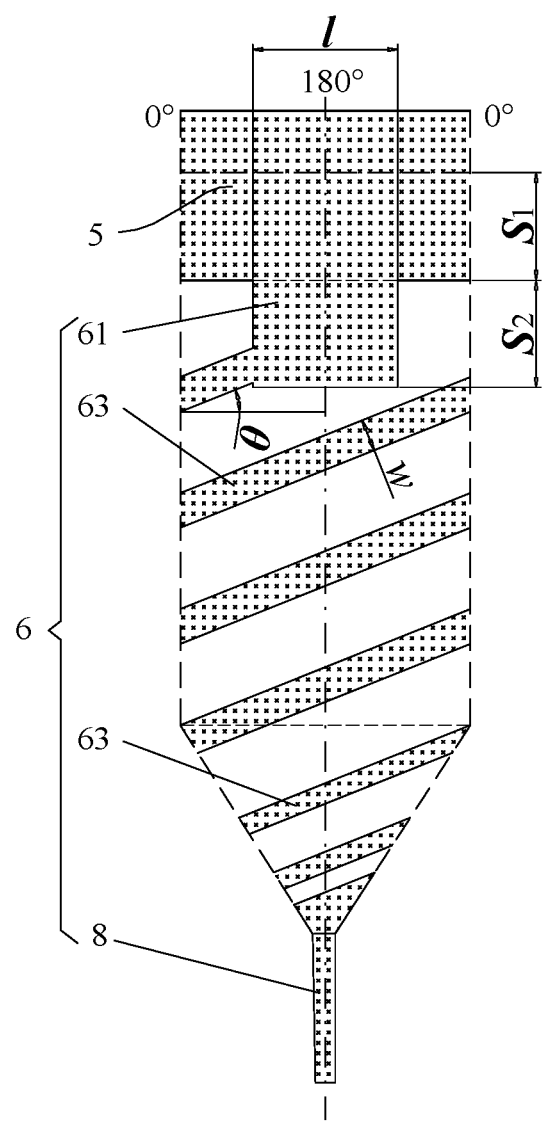
FIG. 8 is an expanded view of a core tube and a baffle structure in the cyclone separator illustrated in FIG. 7.

Further, the first baffle 61 may be directly connected to the lower end of the core tube 5 in a sealed manner. The first baffle 61 is a first arc-shaped plate 611, and is arranged opposite to the gas inlet 11 in the circumferential direction. Optionally, the first baffle 61 is concentric with the core tube 5, and the central portion of the first baffle 61 is arranged at a position with an azimuth angle of 180°. The first baffle 61 is an arc-shaped façade with an arc angle of 180°, i.e., the circumferential area of the sidewall of the core tube 5 corresponding to the first baffle 61 has a central angle of 180°. As illustrated in FIGS. 7 and 8, the core tube 5, the first baffle 61, and spiral baffle 63 are unfolded into a plane, and a width/of the first baffle 61 having been unfolded is equal to a half of a perimeter of the core tube 5. Further, a height of the first baffle 61 is denoted as $S_2$, which satisfies $0.2 \leq (S_2/S_1) \leq 2.0$, and exemplarily $S_2/S_1=0.7$. The spiral baffle 63 is of spiral band shape, and extends from a lower middle part of the first baffle 61 and is coaxial and parallel to the shell 2. The spiral baffle 63 gradually spirally withdraws at the first conical barrel 22 to the lower part thereof to connect the vortex stabilizing stick 8. A ratio of a width w of the spiral baffle 63 to a height of the inlet of the cyclone separator ranges from 0.8 to 2.1, and a spiral angle $\theta$ of the spiral baffle 63 ranges from 15° to 75°. The spiral angle $\theta$ of the spiral baffle 63 is close to or equal to that of the spirally downward band-shaped gas-flow body with dust, and the width w of the spiral baffle 63 is close to or equal to that of the spirally downward band-shaped gas-flow body with dust.

Figure 9:
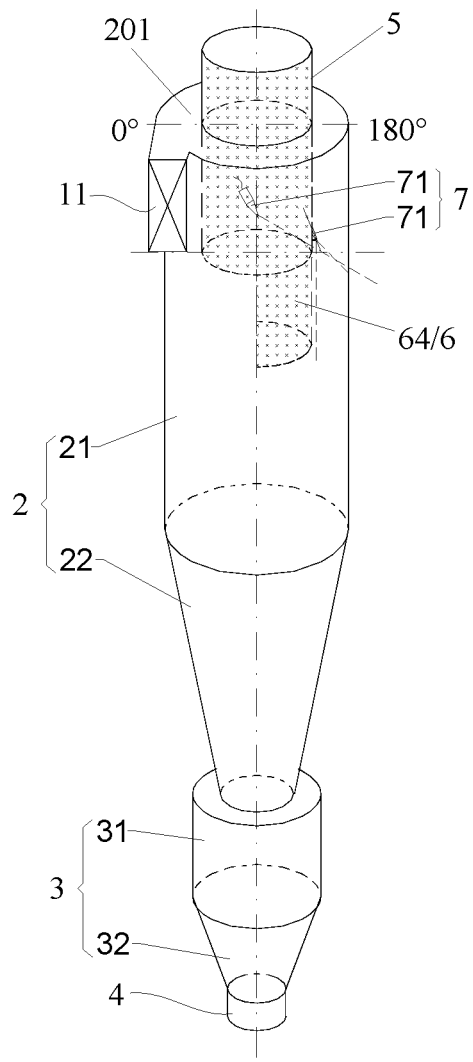
FIG. 9 is a schematic structural diagram of a cyclone separator according to another embodiment of the present disclosure.
Figure 10:
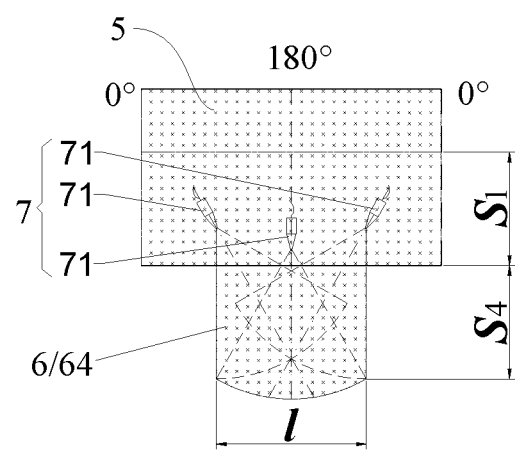
FIG. 10 is an expanded view of a core tube and a baffle structure in the cyclone separator illustrated in FIG. 9.

In some embodiments, the cyclone separator includes a gas injection device 7 for injecting gas downward to form a gas curtain 64, which serves as a baffle structure 6. Since the lower end of the core tube 5 is located at the negative pressure center of the flow field of the cyclone separator, the to-be-treated gas flowing around the core tube 5 will generate a strong short-circuit flow at a position with an azimuth angle of 180° at the lower end of the core tube 5, which makes the particles have a tendency of merging into the inner vortex flow. Therefore, in this embodiment, as illustrated in FIGS. 9 and 10, the gas injection device 7 is provided to inject jet-flow of steam or other inert gas to form the gas curtain 64 at the lower end of the core tube 5, so as to effectively eliminate the short-circuit flow. Meanwhile, the jet-flow of steam or other inert gas generates a centrifugal drag force on the particles in the outer vortex flow area, which improves the centrifugal acceleration of the particles in this area, and improves the separation efficiency of fine particles. Exemplarily, the formed gas curtain 64 has an arc angle of 180°.

Further, the gas injection device 7 includes a plurality of nozzles 71, which inject jet-flow of steam or other inert gas at a high speed to form an arc-shaped façade, thereby forming the gas curtain 64 at the lower end of the core tube 5. Specifically, the gas injection device 7 includes at least three groups of nozzles 71, which are mounted on upper middle part of the sidewall of the core tube 5 at a mounting azimuth angle of 90° to 270°. As illustrated in FIG. 10, an influence length of the jet-flow injected by the nozzle 71 is denoted as $S_4$, which satisfies $0.5 \leq (S_4/S_1) \leq 2.0$. Exemplarily, $(S_4/S_1)=1.0$. An included angle between the nozzle 71 and the sidewall of the core tube 5 is equal to or greater than a half of an injection angle of the nozzle 71, and the injection angle is a cone angle of a conical jet-flow injected from the nozzle 71.

The cyclone separator improves the separation efficiency of the particles, especially for fine particles with particle diameters of 1 μm to 10 μm, while reducing the pressure drop thereof, and meeting the increasingly strict environmental protection emission requirements. The cyclone separator also has the advantage of simplicity of construction, which is suitable for any tangential cyclone separator to facilitate the upgrade and the reconstruction of the existing device.

It is another aspect of the present disclosure to provide a cyclone separation method, which adopts the cyclone separator as described above. The cyclone separation method includes: the to-be-treated gas enters the shell through the gas inlet, the particles separated from the gas by centrifugal force are discharged downward through the shell outlet 12, the clean gas is discharged upward through the core tube 5, and the baffle structure 6 prevents the particles from entering the core tube 5 along with the gas flowing in a radial direction.

Most of the particles in the to-be-treated gas are separated from the gas-flow body by centrifugal force, move radially to the wall of the shell and captured by the wall, then move downward along the wall of the shell 2 and are discharged from the shell outlet 12. The baffle structure 6 can effectively isolate the particle spiral band in the outer vortex flow area from the inner vortex flow, cut off the passages of the short-circuit flow and the centripetal gas such as the centripetal flow in the particle spiral band area, weaken the strengths of the short-circuit flow, the inner vortex flow and the precessing vortex core, reduce the turbulent intensity of the inner vortex flow, eliminate the back-mixing of particles caused by the short-circuit flow, the centripetal flow in the particle spiral band area and the precessing vortex core, prevent a large amount of particles from entering the inner vortex flow, and effectively improve the separation efficiency of the cyclone separator, especially the separation effect on fine particles with particle diameters of 1 to 10 μm. Meanwhile, the baffle structure 6 can reduce the pressure drop of the cyclone separator, and meet the requirement of high efficiency and low resistance of the cyclone separator.

Those described above are just several embodiments of the present disclosure, and persons skilled in the art can make various changes or modifications to the embodiments of the present disclosure according to the disclosure of the application document without departing from the spirit and scope of the present disclosure.

What is claimed is:

1. A cyclone separator comprising a shell and a core tube, wherein an upper end of the shell is provided with a gas inlet, and a lower end of the shell is provided with a shell outlet; an opening at a lower end of the core tube is provided inside the shell; the lower end of the core tube is provided with a baffle structure, and at least a portion of the baffle structure extends vertically;
   wherein the shell comprises a first cylindrical barrel and a first conical barrel connected to a lower end of the first cylindrical barrel, and the shell outlet is located at a lower end of the first conical barrel;
   wherein the baffle structure extends from the lower end of the core tube to the shell outlet, an annular space is formed between the baffle structure and the shell, and an inner space is formed on an inner side of the baffle structure;
   wherein the baffle structure has an opening through which the annular space is communicated with the inner space, and at least part of the opening of the baffle structure is provided on a portion of the baffle structure located within the first conical barrel;
   wherein the opening of the baffle structure comprises an arc-shaped opening and a spiral opening;
   wherein the baffle structure comprises a first baffle fixedly connected to the lower end of the core tube, and the first baffle extends along an axial direction of the core tube and along part of a circumferential area of a sidewall of the core tube, so as to define the arc-shaped opening extending along the other part of the circumferential area of the sidewall of the core tube;

wherein a lower middle portion of the first baffle is connected to a spiral baffle, which extends spirally along the axial direction of the core tube, so as to define the spiral opening extending spirally along the spiral baffle from a lower end face of the first baffle to the shell outlet; and wherein a lower end of the spiral baffle is connected to a vortex stabilizing stick which extends along the axial direction of the core tube; and wherein the spiral baffle comprises a first section disposed within the first cylindrical barrel and a second section disposed within the first conical barrel, the first section is arranged on a cylindrical surface, the second section is arranged on a conical surface, and a taper of the conical surface is equal to that of the first conical barrel.

2. The cyclone separator according to claim 1, wherein the baffle structure is fixedly connected to the lower end of the core tube, and the baffle structure comprises a plurality of second baffles distributed along the axial direction of the core tube;

wherein each of the plurality of second baffles extends along the axial direction of the core tube and along part of the circumferential area of the sidewall of the core tube, so as to define the opening opposite to each of the plurality of second baffles and extending along the other part of the circumferential area of the sidewall of the core tube; and wherein two adjacent second baffles of the plurality of second baffles are arranged opposite to each other and at least partially overlapped with each other in a circumferential direction.

3. The cyclone separator according to claim 2, wherein the opening comprises arc-shaped openings of column shape and conical openings of cone shape, and the core tube is a cylindrical barrel;

wherein some second baffles of the plurality of second baffles are second arc-shaped plates of column shape, each of the second arc-shaped plates extends along part of the circumferential area of the sidewall of the core tube, so as to define each of the arc-shaped openings extending along the other part of the circumferential area of the sidewall of the core tube, and the arc-shaped openings are located within the first cylindrical barrel;

wherein some other second baffles of the plurality of second baffles are conical plates of cone shape, each of the conical plates extend along part of the circumferential area of the sidewall of the core tube, so as to define each of the conical openings extending along the other part of the circumferential area of the sidewall of the core tube, and the conical openings are located within the first conical barrel;

wherein an outer diameter of the conical plate gradually decreases from an upper end to a lower end thereof, and the conical plates are located at a lower end of the second arc-shaped plate; and wherein the baffle structure comprises a vortex stabilizing stick connected to the lower end of the conical plate, and the vortex stabilizing stick extends along an axial direction of the core tube.

4. The cyclone separator according to claim 1, wherein a lower end of the first conical barrel is provided with a dust hopper which comprises a second cylindrical barrel and a second conical barrel, and the second conical barrel is connected to a lower end of the second cylindrical barrel; and wherein an inner diameter of the second cylindrical barrel is greater than that of the lower end of the first conical barrel.

5. A cyclone separation method using the cyclone separator according to claim 1, wherein the cyclone separation method comprises: a to-be-treated gas with particles enters the shell through the gas inlet; at least some of the particles in the to-be-treated gas are prevented by the baffle structure from entering the core tube along with the gas flowing in a radial direction, so that substantially all of the particles are separated from the gas by centrifugal force and discharged downward through the shell outlet; a clean gas is discharged upward through the core tube;

wherein the to-be-treated gas entering an outer vortex flow area between the core tube and the shell via the gas inlet becomes an outer vortex flow, and the outer vortex flow flows downward in the annular space between the baffle structure and the shell; and wherein when the outer vortex flow moves downward along an axial direction of the shell to a vicinity of the shell outlet, it turns back upward to form an inner vortex flow, which enters the inner space via the opening within the first conical barrel, then enters the core tube, and is finally discharged through the core tube.

* * * * *